Patented July 20, 1943

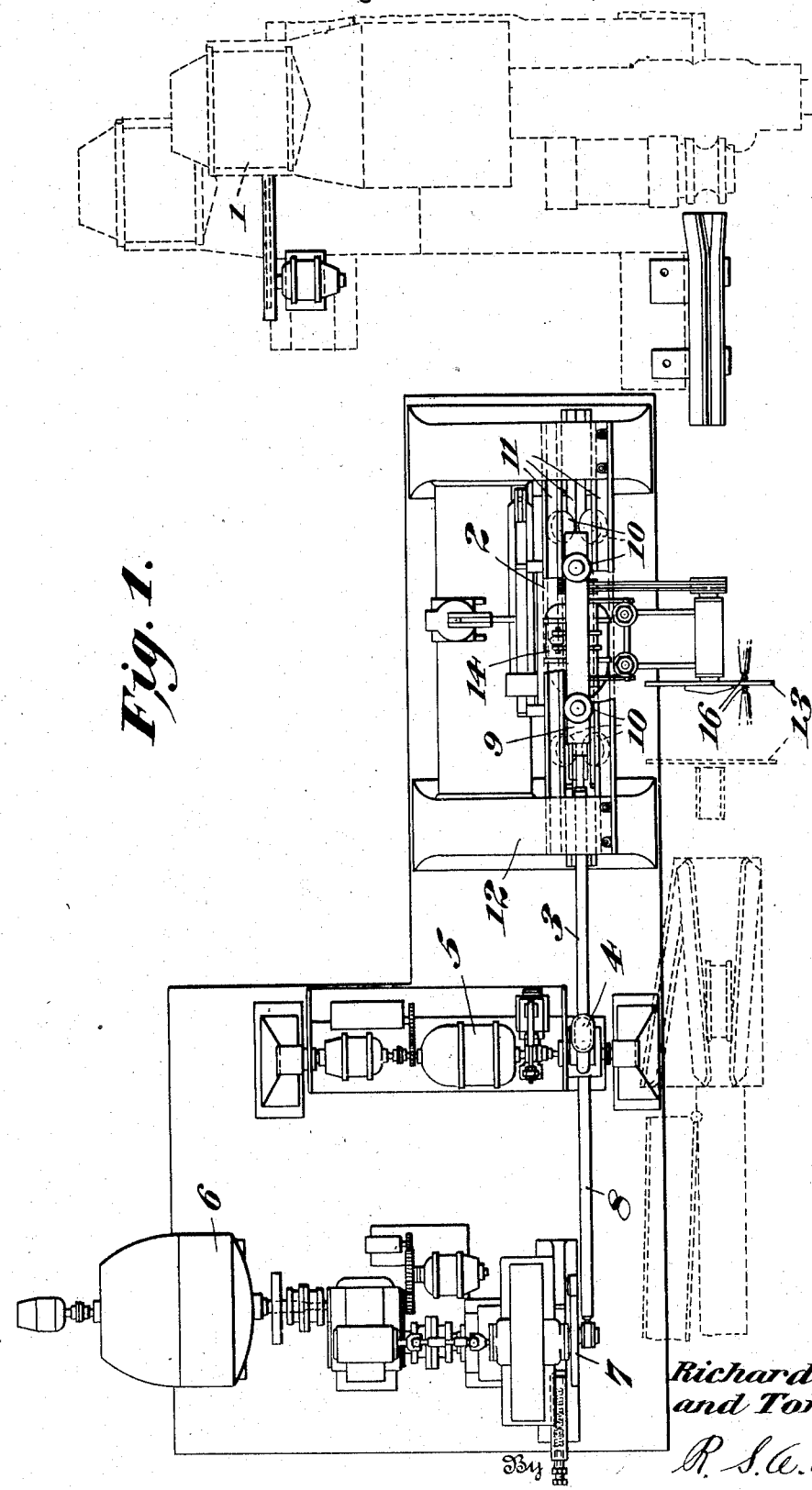

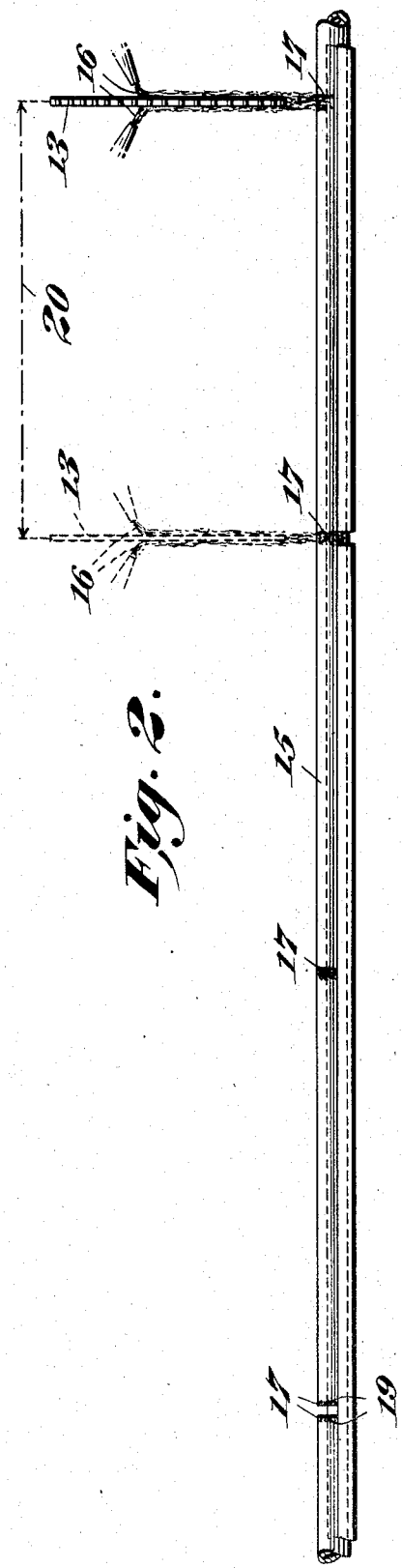
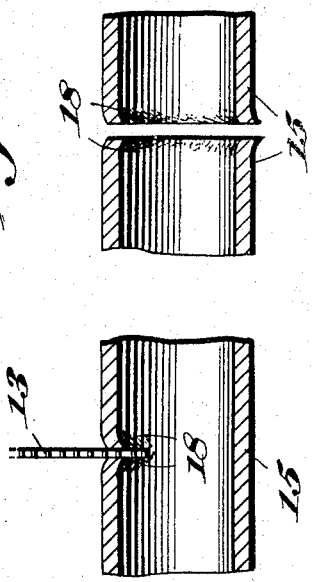
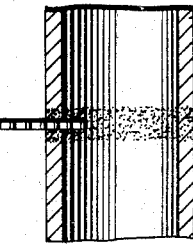
Inventors
Richard H. Stevens,
and Tom Wilson.

2,324,737

UNITED STATES PATENT OFFICE 2,324,737

METHOD OF CUTTING PIPE

Richard H. Stevens and Tom Wilson, Baltimore, Md., assignors to Bethlehem Steel Company, a corporation of Pennsylvania Original application February 5, 1941, Serial No. 377,504. Divided and this application May 5, 1942, Serial No. 441,808

11 Claims. (Cl. 29—69)

This invention relates to a method and apparatus for automatically severing moving objects such as pipes, rods and the like into predetermined length and it more especially relates to a method for use with a continuous butt weld pipe mill, and is a division of our copending application entitled Automatic cutting apparatus, filed February 5, 1941, Serial No. 377,504.

In pipe mills of this type the skelp used when it comes from the rolling mill is in the form of coils. These coils are fed rapidly in succession to a machine which uncoils the skelp and straightens it and then it is advanced in a ribbon form on a run out table or floor of the mill to form a long loop. After a coil has been fed in this manner the next coil is placed in the machine for uncoiling. As this coil is fed to the run out table the crop ends of the rear end for the fed coil and the forward end of the coil to be fed are cut off and the two ends welded together. From the run out table the skelp is passed through a heating furnace where the skelp is heated to a welding temperature. The skelp after issuing from the heating furnace is drawn through a bell or forming rolls, then between sets of welding and sizing rolls, thence is cut into commercial lengths and passed between scale removing rolls and finally conveyed to a cooling bed to cool.

In forming butt welded pipe in this manner the skelp and pipe formed therefrom are advanced continuously at high speed. As an example in making 3-inch pipe the skelp and pipe formed therefrom will travel forward at the rate of about 125 feed a minute, while in making 1½ inch pipe the travel will be over 300 feed per minute.

The pipe is cut into commercial lengths just after passing between the welding and sizing rolls and it is necessary to have the saw travel at the same speed as that of the pipe during the cutting operation.

The object of our invention relates to the method of cooling the pipe at the point to be cut and then severing the pipe through the cooled area to prevent distortion of the ends of the pipe sections during the cutting operation.

In the above mentioned copending application Serial No. 377,504 apparatus is shown and described for cutting into predetermined lengths continuously moving pipe and means for synchronizing the movement of a pipe severing device with the moving pipe.

It also describes means which can be preset to indicate the travel of the pipe in feet per minute, mechanism which can be preset to automatically cut a plurality of pipe sections of uniform lengths, and mechanism by means of which pipe sections of different lengths can be automatically cut, and further discloses means for adjusting the stroke of the saw carriage and for automatically tilting the saw carriage to bring the saw into cutting engagement with the pipe, but as this application relates to a method of cutting pipe including cooling localized sections of the pipe and cutting at such sections, only so much of the machine is shown as is necessary for the understanding of our invention.

Having thus given a general description of the objects of our invention, we will now in order to make the same more clear refer to the annexed two sheets of drawings forming a part of this specification and in which like characters of reference indicate like parts:

Figure 1 is a top plan view illustrating the application of our invention.

Fig. 2 illustrates the manner of cooling and forming dark ring marks on the pipe produced by the water or the like which is sprayed on the saw and then flows over the pipe during each reciprocation of the saw carriage;

Figs. 3 and 4 illustrate the smooth cut made by the saw during the cutting operation through the cooled area, and Figs. 5 and 6 illustrate the rough and deformed ends of the pipe sections which have been cut by the saw without cooling the pipe at this point.

Referring now to the various characters of reference on the drawings, the numeral 1, indicates the mill motor, and 2 a saw carriage which is connected by means of a pitman rod 3 to a rocking lever 4, having means actuated by a motor 5 for varying the stroke of the saw carriage.

The saw carriage 2 is continuously driven by means of a motor 6 which rotates a cam 7, connected to the rocking lever 4 by means of a connecting rod 8. This saw carriage is mounted in a rectangular frame 9 and is provided with rollers 10 for engaging tracks 11 secured to a stationary supporting frame 12.

The saw 13 is carried by the saw carriage 2 is continuously driven at high speed by means of a motor 14 and is adapted to be tilted into cutting engagement with the pipe and for return movement after the cutting operation. As the pipe 15 is at substantially a welding temperature when cut, it is necessary to keep the saw cool, and to accomplish this a jet of cooling fluid such as water or the like is sprayed on one or both sides of the saw as indicated at 16 in Figs. 1 and 2. The cooling fluid sprayed on the saw is discharged onto the pipe 15 during the reciprocation of the saw carriage thereby cooling the pipe and producing dark rings 17 thereon, the number of which will correspond to the number of reciprocations of the saw carriage before the cut is made. As an example, assuming that the pipe is being cut into twenty foot lengths with the pipe advancing slightly less than seven feet for each reciprocation of the saw carriage, the length of pipe will have three dark rings and the cut will be made on the third forward stroke through the third dark ring portion.

Heretofore the cut has been made through the pipe while hot and having a uniform temperature thereby deforming the ends of the pipe and producing rough edges as indicated at 18 in Figs. 5 and 6, which had to be cut off or straightened.

In partially cooling the pipe at the point where it is to be severed and then cutting it through the dark ring 17 a clean cut is produced as indicated at 19 in Figs. 2 and 4. A few seconds after the pipe has been cut these dark rings disappear owing to the heat transmitted thereto from the adjacent portions of the pipe, and the pipe will then be of uniform color.

In Fig. 2 one reciprocation of the saw carriage and the movement of the pipe in relation thereto is indicated at 20 and the saw control has been set to cut on the third forward stroke of the carriage, but this number can be varied and the cut made on the first, second or more than three strokes if desired. As the cooling fluid is sprayed on the saw and pipe continuously a dark ring will be produced on the pipe for each reciprocation of the carriage. This dark ring is formed while the saw is traveling simultaneously with the pipe on the forward stroke of the carriage and during the cutting operation. On the return stroke of the carriage the saw will be traveling in the reverse direction to that of the pipe and the movement will be too rapid to produce any noticeable cooling effect on the pipe. These cooled ring areas not only prevent distortion of the ends of the pipe sections during the cutting operation, but if they are too wide indicate that the saw travel does not synchronize properly with the pipe and should be adjusted.

Although we have shown and described our invention in considerable detail, we do not wish it to be limited to the exact details shown and described, but may use such substitutions, modifications or equivalents thereof, as are embraced within the scope of our invention or as pointed out in the claims.

Having thus described our invention, what we claim as new and desire to secure by Letters Patent is:

1. The method of cutting a continuously moving pipe or the like in a highly heated condition, which consists in spraying the pipe with a cooling fluid which travels forward simultaneously with the moving pipe at substantially the same speed, and then severing the pipe through the cooled area.

2. The method of cutting a continuously moving heated pipe, which consists in advancing the cutting means at substantially the same speed as the pipe, spraying the cutting means during its line of travel with a cooling fluid which is discharged onto the pipe during the advancing movement of the cutting means to form a cooled area on the continuously moving pipe, and then severing the pipe through the cooled area.

3. The method of cutting a continuously moving heated pipe, which consists in advancing the cutting means at substantially the same speed of travel as the pipe, spraying the cutting means with a cooling fluid which is discharged onto the pipe from the cutting means during its advancing movement thereby forming a cooled area on the continuously moving pipe, and then severing the pipe through the cooled area.

4. The method of cutting pipe or the like in a highly heated condition, which consists in advancing a pipe heated to a uniform temperature, advancing a continuously rotating saw at substantially the same speed of travel as the pipe, spraying the continuously rotating saw with a cooling fluid which is discharged onto the pipe from the saw during its advancing movement thereby reducing the temperature at this point and forming a dark colored ring on the pipe, and then severing the pipe by the continuously rotating saw through the cooled dark colored ring.

5. The method of cutting a continuously advancing pipe or the like which has been heated to a high uniform temperature, which consists in advancing a continuously rotating saw at substantially the same speed of travel as the pipe, spraying the continuously rotating saw with a cooling fluid which is discharged onto the pipe from the saw during its advancing movement thereby cooling the pipe at this point, and then severing the pipe through the cooled area during the spraying operation.

6. The method of cutting a continuously moving pipe or the like in a highly heated condition, which consists in spraying the pipe with a cooling fluid which travels simultaneously with the moving pipe at the same rate of speed during its advancing movement thereby partially quenching a section of the pipe, and then severing the pipe through the partially quenched section.

7. The method of cutting pipe or the like in a highly heated condition, which consists in advancing a pipe heated to a uniform temperature, advancing a continuously rotating saw at substantially the same speed of travel as the pipe, spraying the continuously rotating saw during its line of travel with a cooling fluid which is discharged onto the pipe from the saw during its advancing movement thereby partially quenching a section of the pipe, and then severing the pipe through the partially quenched section.

8. The method of cutting a continuously moving pipe or the like in a highly heated condition which consists in spraying a section of the pipe with a cooling fluid which travels forward simultaneously with the moving pipe at substantially the same speed, severing the pipe through the cooled section, and observing the width of the cooled section to adjust mechanism to synchronize the movement of the saw travel with the pipe.

9. The method of cutting a continuously advancing pipe or the like which has been heated to a high uniform temperature, which consists in advancing a continuously rotating saw at substantially the same speed of travel as the pipe, spraying the continuously rotating saw with a cooling fluid which is discharged onto the pipe from the saw during its advancing movement thereby cooling a section of the pipe at this point, severing the pipe through the cooled section during the spraying operation, and observing the width of the cooled section to adjust the synchronizing movement of the saw travel with the pipe.

10. The method of cutting a continuously moving pipe or the like in a highly heated condition, which consists in spraying the cutting means and a section of the pipe with a cooling fluid which travels forward simultaneously with the moving pipe and cutting means at substantially the same rate of speed thereby partially quenching a section of the pipe, severing the pipe through the partially quenched section, and observing the width of the cooled section to adjust mechanism to synchronize the movement of the spray travel with the pipe.

11. The method of cutting pipe or the like in a highly heated condition, which consists in advancing a pipe heated to a uniform temperature, advancing a continuously rotating saw at substantially the same speed of travel as the pipe, spraying the continuously rotating saw during its line of travel with a cooling fluid which is discharged onto the pipe from the saw during its advancing movement thereby partially quenching a section of the pipe, severing the pipe through the partially quenched section, and observing the width of the cooled section to indicate the movement of the saw travel with the pipe.

RICHARD H. STEVENS.
TOM WILSON.